US011301854B2

(12) United States Patent
Bergeon et al.

(10) Patent No.: US 11,301,854 B2
(45) Date of Patent: Apr. 12, 2022

(54) CONFIGURABLE TRANSACTION MANAGEMENT CONTROLLER AND METHOD THEREOF

(71) Applicant: Worldpay, LLC, Symmes Township, OH (US)

(72) Inventors: Francois B. Bergeon, Scottsdale, AZ (US); Scot A. Bryant, Chandler, AZ (US); Coy A. Christensen, Scottsdale, AZ (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 16/844,244

(22) Filed: Apr. 9, 2020

(65) Prior Publication Data

US 2020/0234304 A1    Jul. 23, 2020

Related U.S. Application Data

(63) Continuation of application No. 15/827,608, filed on Nov. 30, 2017, now Pat. No. 10,726,421, which is a continuation of application No. 14/755,320, filed on Jun. 30, 2015.

(51) Int. Cl.
*G06Q 20/40* (2012.01)
*H04L 29/08* (2006.01)
*G06Q 20/10* (2012.01)
*H04L 29/06* (2006.01)
*H04L 67/02* (2022.01)

(52) U.S. Cl.
CPC ......... *G06Q 20/4014* (2013.01); *G06Q 20/10* (2013.01); *G06Q 20/40* (2013.01); *H04L 63/00* (2013.01); *H04L 67/02* (2013.01)

(58) Field of Classification Search
None
See application file for complete search history.

(56) References Cited

U.S. PATENT DOCUMENTS

| 5,357,563 | A  | 10/1994 | Hamilton et al. |
| 5,870,473 | A  | 2/1999  | Boesch et al.   |
| 7,552,333 | B2 | 6/2009  | Wheeler et al.  |

(Continued)

OTHER PUBLICATIONS

Author Unknown, LivePOS Features, 2015, retrieved from LivePOS. com https://web.archive.org/web/20150228112651/http://www.livepos.com:80/links/features.aspx (Year: 2015).*

*Primary Examiner* — Gregory S Cunningham, II
(74) *Attorney, Agent, or Firm* — Bookoff McAndrews, PLLC

(57) ABSTRACT

Technologies for managing payment authorization request messaging for payment transactions include a transaction management controller for receiving a transaction amount for a payment transaction from a business management engine and payment card data for the payment transaction from a point of interaction device. The transaction management controller inserts the transaction amount and the payment card data into a payment authorization request message, which is transmitted to a payment network. A payment authorization response message is received from the payment network and transmitted by the transaction management controller the business management engine. Other embodiments are described and claimed.

20 Claims, 6 Drawing Sheets

(56) References Cited

U.S. PATENT DOCUMENTS

| | | | |
|---|---|---|---|
| 7,587,196 B2* | 9/2009 | Hansen | G06Q 20/00 |
| | | | 455/406 |
| 7,904,339 B2 | 3/2011 | Shah et al. | |
| 8,543,461 B2 | 9/2013 | Mutha | |
| 9,305,295 B2 | 4/2016 | Laracey | |
| 9,449,320 B1 | 9/2016 | Walters et al. | |
| 10,261,489 B2 | 4/2019 | Gandelsman | |
| 2008/0189184 A1 | 8/2008 | Kubo et al. | |
| 2011/0055033 A1 | 3/2011 | Chen et al. | |
| 2011/0251892 A1 | 10/2011 | Laracey | |
| 2012/0310756 A1* | 12/2012 | Agashe | G06Q 20/34 |
| | | | 705/17 |
| 2013/0132184 A1 | 5/2013 | Mutha | |
| 2013/0166332 A1* | 6/2013 | Hammad | G06Q 20/12 |
| | | | 705/5 |
| 2014/0019352 A1 | 1/2014 | Shrivastava | |
| 2014/0129357 A1 | 5/2014 | Goodwin | |
| 2014/0180924 A1* | 6/2014 | Ozvat | G06Q 20/20 |
| | | | 705/44 |
| 2014/0207682 A1* | 7/2014 | Wolfond | G06Q 20/3276 |
| | | | 705/44 |
| 2015/0012420 A1* | 1/2015 | Kim | G06Q 20/14 |
| | | | 705/40 |
| 2015/0081462 A1 | 3/2015 | Ozvat et al. | |
| 2016/0034872 A1 | 2/2016 | Hendrick et al. | |
| 2016/0034876 A1 | 2/2016 | Speiser et al. | |
| 2016/0125449 A1 | 3/2016 | Beatty et al. | |
| 2016/0277380 A1 | 9/2016 | Wagner et al. | |
| 2017/0011375 A1* | 1/2017 | Takasu | G06Q 20/22 |
| 2020/0265399 A1* | 8/2020 | Sweitzer | G06Q 20/204 |

\* cited by examiner

CONFIGURABLE TRANSACTION MANAGEMENT CONTROLLER AND METHOD THEREOF

CROSS-REFERENCE TO RELATED APPLICATION(S)

This patent application is a continuation of and claims the benefit of priority to U.S. application Ser. No. 15/827,608, filed on Nov. 30, 2017, which is a continuation of and claims the benefit of priority to U.S. application Ser. No. 14/755,320, filed on Jun. 30, 2015, the entireties of which are incorporated herein by reference.

TECHNICAL FIELD

Embodiments of the technologies described herein relate, in general, to the field of payment transactions. More particularly, the technologies described herein relate to the field of managing payment authorization request messaging for payment transactions.

BACKGROUND

Merchants accept consumer payments for goods and services through point-of-sale ("POS") terminals and corresponding business applications. Configuring such POS terminals and business applications to accept and process payment transactions is a complex and time consuming process. For example, conventional POS terminals and business applications must be configured to support and communicate with various different payment networks as well as a variety of different card readers and PIN pads. Such configuration typically requires sophisticated programming knowledge in connection with payment processing transactions. Additionally, POS terminals are increasingly being required to be certified by various payment networks, a process which is also complex and time consuming.

SUMMARY

In an embodiment, the present disclosure is directed, in part, to a method for managing payment authorization request messaging for payment transactions, the method includes receiving, by a transaction management controller and from a business management engine, a transaction amount for a payment transaction, the transaction amount for insertion by the transaction management controller into a payment authorization request message. The method further includes requesting, by the transaction management controller and from a point of interaction device, payment card data for the payment authorization request message, wherein the business management engine is communicatively isolated from the point of interaction device. In addition, the method includes receiving, by the transaction management controller and from the point of interaction device, the requested payment card data for insertion by the transaction management controller into the payment authorization request message. The method also includes inserting, by the transaction management controller, the payment card data received from the point of interaction device and the transaction amount received from the business management engine into the payment authorization request message. The method further includes transmitting, by the transaction management controller and to a payment network, the payment authorization request message and receiving, by the transaction management controller and from the payment network, a payment authorization response message for the payment authorization request message. The method also includes transmitting, by the transaction management controller and to the business management engine, the payment authorization response message for generation of a receipt.

In another embodiment, the present disclosure is directed, in part, to one or more machine-readable storage media including a plurality of instructions stored thereon that in response to being executed by a transaction management controller, cause the transaction management controller to receive, from a business management engine, a transaction amount for a payment transaction, the transaction amount for insertion by the transaction management controller into a payment authorization request message. The plurality of instructions further cause the transaction management controller to request, from a point of interaction device, payment card data for the payment authorization request message, wherein the business management engine is communicatively isolated from the point of interaction device. The plurality of instructions also cause the transaction management controller to receive, from the point of interaction device, the requested payment card data for insertion by the transaction management controller into the payment authorization request message and insert the payment card data received from the point of interaction device and the transaction amount, received from the business management engine into the payment authorization request message. In addition, the plurality of instructions further cause the transaction management controller to transmit, to a payment network, the payment authorization request message and receive, from the payment network, a payment authorization response message for the payment authorization request message. The plurality of instructions also cause the transaction management controller to transmit, to the business management engine, the payment authorization response message for generation of a receipt.

In another embodiment, the present disclosure is directed, in part, to a system for managing payment authorization request messaging for payment transactions, the system includes a transaction management controller comprising a processor executing instructions stored in memory, wherein the instructions cause the processor to receive, from a business management engine, a transaction amount for a payment transaction, the transaction amount for insertion by the transaction management controller into a payment authorization request message. The instructions further cause the processor to request, from a point of interaction device, payment card data for the payment authorization request message, wherein the business management engine is communicatively isolated from the point of interaction device. In addition, the instructions cause the processor to receive, from the point of interaction device, the requested payment card data for insertion by the transaction management controller into the payment authorization request message and insert the payment card data received from the point of interaction device and the transaction amount received from the business management engine into the payment authorization request message. The instructions also cause the processor to transmit, to a payment network, the payment authorization request message and receive, from the payment network, a payment authorization response message for the payment authorization request message. In addition, the instructions cause the processor to transmit, to the business management engine, the payment authorization response message for generation of a receipt.

In another embodiment, the present disclosure is directed, in part, to a system for remotely configuring transaction management controllers, the system includes a first transaction management controller communicatively coupled to a first business management engine, a first point of interaction device, and a payment network, wherein the first business management controller is communicatively isolated from the first point of interaction device, and wherein the first transaction management controller includes a first set of local features for managing payment processing for payment transactions. In addition, the system includes a second transaction management controller communicatively coupled to a second business management engine, a second point of interaction device, and the payment network, wherein the second business management engine is communicatively isolated from the second point of interaction device, and wherein the second transaction management controller includes a second set of local features for managing payment processing for payment transactions. The system further includes a remote configuration device having a processor executing instructions stored in memory, wherein the instructions cause the processor to transmit a feature modification message to at least one of the first transaction management controller and the second transaction management controller, the feature modification message includes configuration data to at least one of modify or add a feature of at least one of the first set of local features of the first transaction management controller and the second set of local features of the second transaction management controller.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
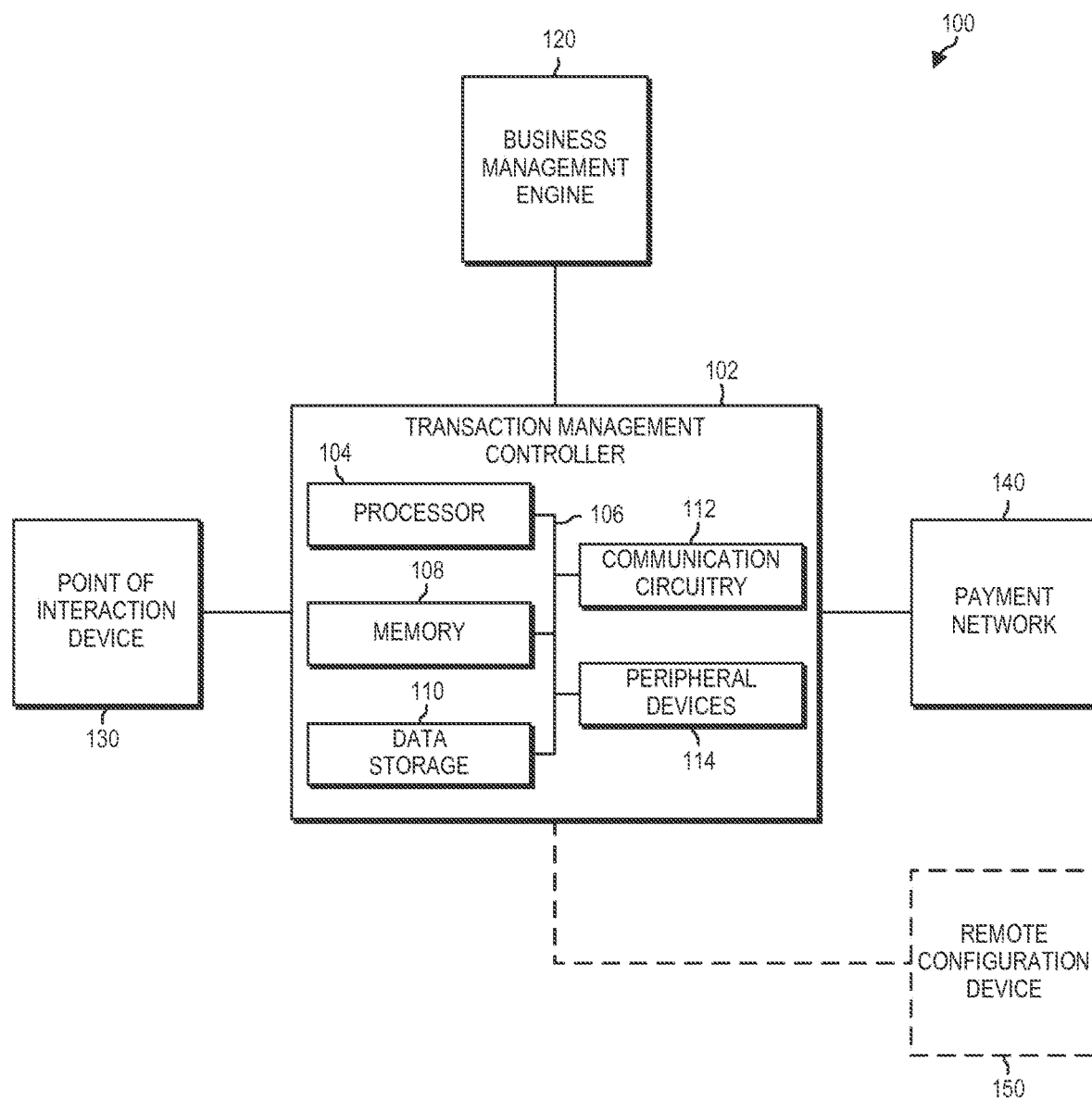
FIG. 1 is a simplified block diagram of at least one embodiment of a system for managing payment authorization request messaging for payment transactions.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others, and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle" or a "payment card." which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles or payment card can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument.

Referring now to FIG. 1, in one embodiment, a system 100 for managing payment authorization request messaging for payment transactions includes a transaction management controller 102, a business management engine 120, a point of interaction (POI) device 130, and a payment network 140. In some embodiments, the system 100 includes a remote configuration device 150. In operation, the transaction management controller 102 receives a payment request from the business management engine 120 in connection with a payment transaction. The payment request includes a transaction amount and can be embodied as a Hypertext Transfer Protocol (HTTP) message. After receiving the payment request, the transaction management controller 102 requests payment card data (e.g., a payment card number, a payment card type, etc.) for the payment transaction from the POI device 130 (e.g., a card reader, a PIN pad, etc.). In the illustrative embodiment, the POI device 130 is communicatively isolated from the business management engine 120.

Once the payment card data is received from the POI device 130, the transaction management controller 102 inserts the received transaction amount and the payment card data into a payment authorization request message. The transaction management controller 102 transmits the payment authorization request message to the payment network 140, which as described in more detail below, can be embodied as, or otherwise include, a payment gateway (not shown). A payment authorization response message is then received from the payment network 140 (or the payment gateway) in response to the payment authorization request message. The transaction management controller 102 transmits the received payment authorization response message to the business management engine 120.

In some embodiments, the transaction management controller 102 is configured to interface with and control features and/or functionality of the POI device 130. For example, in some embodiments, the transaction management controller 102 can be configured to control selectable options (e.g., payment card type selections, cashback selections, transaction amount verification, language selections, etc.) that are to be displayed to a consumer via the POI device 130. Additionally or alternatively, the transaction management controller 102 can be configured to control payment transaction processing features (e.g., signature prompting features, PIN entry features, customized informational display screens, scrolling receipt features, etc.) provided by the POI device 130.

The transaction management controller 102 can be embodied as any type of computing device or server or capable of processing, communicating, storing, maintaining, and transferring data. For example, the transaction management controller 102 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the transaction management controller 102 can be embodied as a computing device integrated with other systems or subsystems. In the illustrative embodiment of FIG. 1, the transaction management controller 102 includes a processor 104, a system bus 106, a memory 108, a data storage 110, communication circuitry 112, and one or more peripheral devices 114. Of course, the transaction management controller 102 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 108, or portions thereof, can be incorporated in the processor 104 in some embodiments. Furthermore, it should be appreciated that the transaction management controller 102 can include other components, sub-components, and devices commonly found in a computer and/or computing device, which are not illustrated in FIG. 1 for clarity of the description.

The processor 104 can be embodied as any type of processor capable of performing the functions described herein. For example, the processor 104 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the transaction management controller 102 includes a system bus 106 for interconnecting the various components of the transaction management controller 102. The system bus 106 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 104, the memory 108, and other components of the transaction management controller 102. In some embodiments, the transaction management controller 102 can be integrated into one or more chips such as a programmable logic device or an application specific integrated circuit (ASIC). In such embodiments, the system bus 106 can form a portion of a system-on-a-chip (SoC) and be incorporated, along with the processor 104, the memory 108, and other components of the transaction management controller 102, on a single integrated circuit chip.

The memory 108 can be embodied as any type of volatile or non-volatile memory or data storage capable of performing the functions described herein. For example, the memory 108 can be embodied as read only memory (ROM), random access memory (RAM), cache memory associated with the processor 104, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory 108 can store various data and software used during operation of the transaction management controller 102 such as operating systems, applications, programs, libraries, and drivers.

The data storage 110 can be embodied as any type of device or devices configured for short-term or long-term storage of data such as, for example, memory devices and circuits, memory cards, hard disk drives, solid-state drives, or other data storage devices. For example, in some embodiments, the data storage 110 includes storage media such as a storage device that can be configured to have multiple modules, such as magnetic disk drives, floppy drives, tape drives, hard drives, optical drives and media, magneto-optical drives and media, compact disc drives. Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 104, or the memory 108 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In some embodiments, the data storage device 110 can be configured to store a set of local payment processing features of the transaction management controller 102. Each feature can be configured to provide different functionality of the transaction management controller 102 and/or the POI device 130. As such, each feature can be toggled "on" or toggled "off" to control the features provided by the transaction management controller 102 and/or the POI device 130. The local payment processing features can include device configuration features and/or settings (e.g., listening port settings, security settings, user settings, etc.), transaction professing features and/or settings (e.g., partial approval features, transaction amount confirmation features, cashback features, accepted payment card settings, supported language settings, transaction gratuity features, signature requirement features, transaction store and forward features, etc.), multilane features and/or settings (e.g., lane identification features, lane initialization settings, etc.), POI device 130 features and/or settings (e.g., terminal type settings, driver configurations, communication settings, etc.), and any other type of payment processing feature or configuration setting for the transaction management controller 102 or a device controlled or managed thereby (e.g., the POI device 130).

The communication circuitry 112 of the transaction management controller 102 may be embodied as any type of communication circuit, device, interface, or collection thereof, capable of enabling communications between the transaction management controller 102 and the business management engine 120, POI device 130, payment network 140, remote configuration device 150, and/or any other computing device communicatively coupled thereto. For example, the communication circuitry 112 may be embodied as one or more network interface controllers (NICs), in some embodiments. The communication circuitry 112 may be configured to use any one or more communication technologies (e.g., wireless or wired communications) and associated protocols (e.g., Ethernet, Wi-Fi®, WiMAX, etc.) to effect such communication.

In some embodiments, the transaction management controller 102, business management engine 120, POI device 130, payment network 140, remote configuration device 150, and/or any other computing devices of the system 100, can communicate with each other over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communication between the computing devices of the system 100.

Additionally, in some embodiments, the transaction management controller 102 can further include one or more peripheral devices 114. Such peripheral devices 114 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

The business management engine 120 can be embodied as any type of computing device capable of performing the functions described herein. As such, the business management engine 120 can include devices and structures commonly found in computing devices such as processors, memory devices, communication circuitry, and data storages, which are not shown in FIG. 1 for clarity of the description. The business management engine 120 can be configured to perform certain business-related functions, such as, without limitation, inventory management, scheduling, accounting processes, payroll, and the like. As is to be appreciated, the particular business-related functions facilitated by a business management engine may depend on the needs of the particular business (e.g., merchant) utilizing the business management engine. In this regard, a business management engine of a salon may provide different business-related functions than that of a specialty retailer, for example. In some embodiments, the business management engine 120 is configured to initiate payment transactions. As discussed in more detail below, the business management engine 120 is configured to communicate with the transaction management controller 102 to facilitate such payment transactions. For example, in some embodiments, the business management engine 120 is configured to transmit a payment request to the transaction management controller 102. The payment request can be embodied as an HTTP message that includes the amount of the transaction. Additionally, the business management engine 120 can be configured to receive a payment authorization response message from the transaction management controller 102. As discussed in more detail below, the business management engine 120 can be communicatively isolated from the POI device 130 (e.g., not in direct communication with the POI device 130). As such, instead of being directly connected to the POI device 130, the business management engine 120 is communicatively coupled to the transaction management controller 102, which manages communications with the POI device 130. It should be appreciated that in doing so, the complexity of configuring (e.g., coding, certification, initialization, etc.) of the business management engine 120 is reduced.

Additionally, in some embodiments, the business management engine 120 can transmit data to the transaction management controller 102 for subsequent display on the POI device 130 during a purchase or payment transaction. For example, in some embodiments, the business management engine 120 can be configured to transmit scrolling receipt data to the transaction management device 102. In turn, the transaction management device 102 can transmit the scrolling receipt data to the POI device 130. In such embodiments, the scrolling receipt data can include product scan data (e.g., product identifiers, product names, product descriptions, etc.) and product sales price data. It should be appreciated that the scrolling receipt data can include any other type of data associated with a purchase or payment transaction.

The point of interaction (POI) device 130 can be embodied as any type of computing or payment device capable of performing the functions described herein. For example, in the illustrative embodiment, the POI device 130 can be embodied as a card reader or a PIN pad configured to facilitate receipt of a payment card for a payment transaction (e.g., a credit or debit transaction). The POI device 130 can include devices and structures commonly found in computing and payment devices such as processors, memory devices, communication circuitry, and data storages, which are not shown in FIG. 1 for clarity of the description. As discussed, in some embodiments, the POI device 130 is communicatively isolated from the business management engine 120. In such embodiments, the POI device 130 instead communicates directly with the transaction management controller 102 via a wired or wireless communication link (i.e., a point-to-point link, bus link, wire, cable, light guide, printed circuit board traces, wireless link, etc.). As such, the POI device 130 can be controlled by the transaction management controller 102, which can include the necessary drivers to do so.

The payment network 140 can be, for example, a network of a credit card association affiliated with a payment vehicle or payment card (e.g., credit cards, debit cards, smart cards, single-use cards, pre-paid cards, electronic currency, etc.), which generally refers to any type of financial alternative to currency. Non-limiting examples of credit card associations include VISA, MASTERCARD, DISCOVER, and AMERICAN EXPRESS. In some embodiments, the payment network 140 receives a payment authorization request message from the transaction management controller 102 for a payment transaction. The payment network 140 can provide the payment authorization request message to a payment processing server of an issuer processor, which in turn can provide the payment authorization request message to an issuer financial institution. The issuer financial institution can then associate the payment vehicle or payment card used with an account held by the issuer financial institution. Thereafter, the issuer financial institution can transmit a payment authorization response message to the payment network 140 via the issuer processor. In response to receiving the payment authorization response message, the payment network 140 can transmit the payment authorization response message to the transaction management controller 102. In some embodiments, the payment network 140 includes a payment gateway (not shown) configured to facilitate the transaction management controller 102 or, more generally, merchants in processing payment transactions.

The remote configuration device 150 can be embodied as any type of computing device capable of performing the functions described herein. As such, the remote configuration device 150 can include devices and structures commonly found in computing devices such as processors, memory devices, communication circuitry, and data storages, which are not shown in FIG. 1 for clarity of the description. In some embodiments, the remote configuration device 150 is configured to configure and/or manage payment processing features of the transaction management controller 102, multiple transaction management controllers (e.g., the transaction management controller 312 and the transaction management controller 322 illustratively shown in FIG. 3), and/or other devices of the system 100 (e.g., the POI device 130). To do so, the remote configuration device 150 can generate one or more feature modification message, which can be transmitted to the transaction management controller. As discussed in more detail below, the feature modification message can include configuration data, which can be used by the transaction management controller 102 to add or modify a local payment processing feature. In embodiments in which the remote configuration device 150 is configured to configure and/or manage multiple transaction management controllers, the remote configuration device 150 can selectively transmit feature modification messages to each transaction management controller.

In some embodiments, the transaction management controller 102, the business management engine 120, the point of interaction device 130, the payment network 140 (or computing devices thereof), and the remote configuration device 150 can each establish an environment during operation. Each environment can include various modules, components, sub-components, and devices commonly found in computing devices, which are not illustrated in the figures for clarity of the description. The various modules, components, sub-components, and devices of each environment can be embodied as hardware, firmware, software, or a combination thereof. For example, one or more of the modules, components, sub-components, and devices of each environment can be embodied as a processor and/or a controller configured to provide the functionality described herein.

Figure 2:
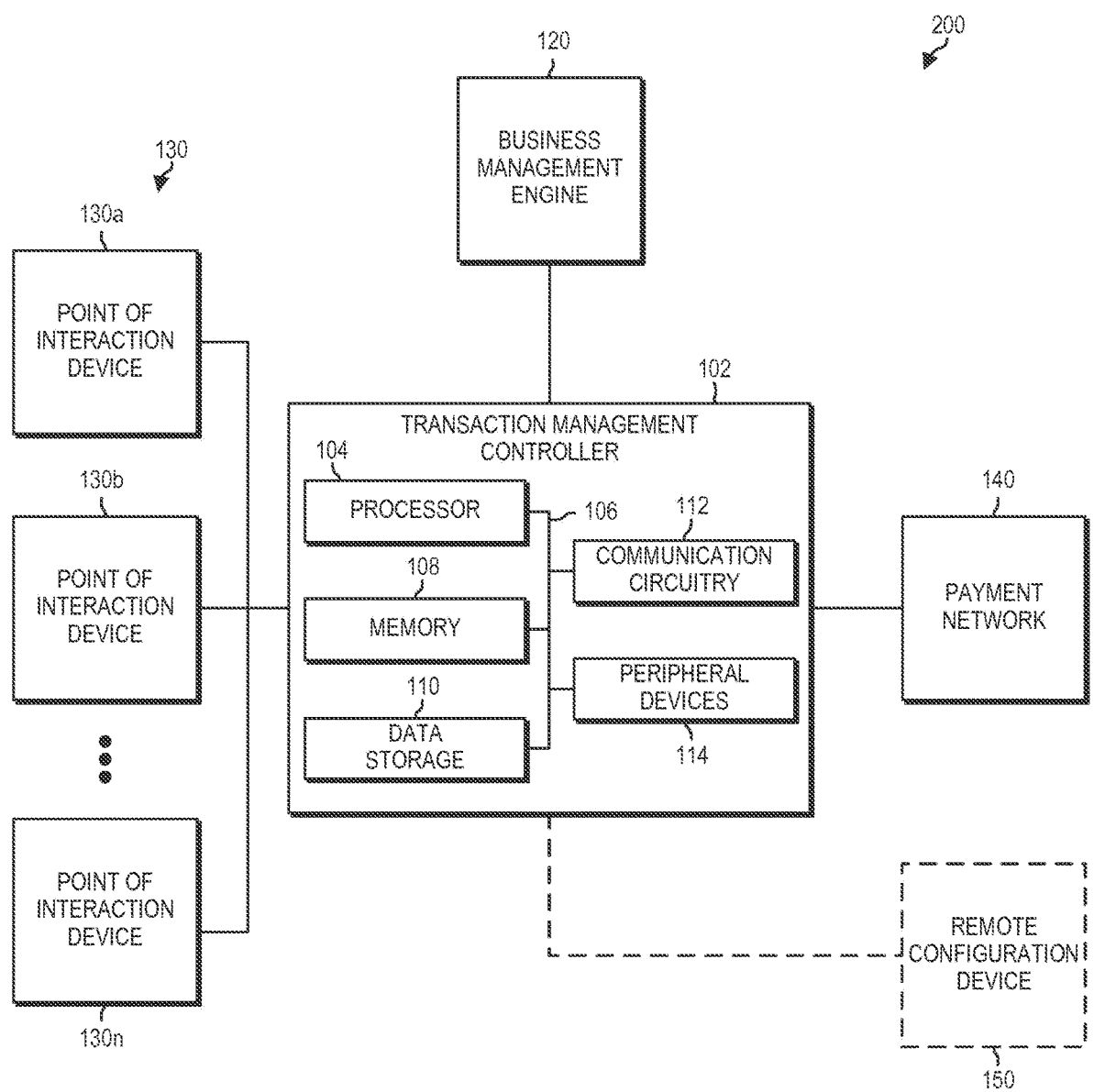
FIG. 2 is a simplified block diagram of at least one embodiment of a system for managing payment authorization request messaging for multi-lane payment transactions.

Referring now to FIG. 2, in an embodiment, a system 200 for managing payment authorization request messaging for multi-lane payment transactions includes the transaction management controller 102, the business management engine 120, multiple point of interaction (POI) devices 130 (e.g., the POI device 130*a*, POI device 130*b*, POI device 130*n*, etc.), and the payment network 140. In some embodiments, the system 200 includes the remote configuration device 150. As illustratively shown, the transaction management controller 102 can manage and, therefore, be communicatively coupled to multiple POI devices 130. Each POI device 130 (e.g., the POI device 130*a*, POI device 130*b*, POI device 130*n*, etc.) of the system 200 may be embodied as a different "lane" in a multi-lane environment. As such, it should be appreciated that each of the devices illustratively shown in FIG. 2 may be substantially similar to the devices illustratively shown and described with respect to FIG. 1.

Figure 3:
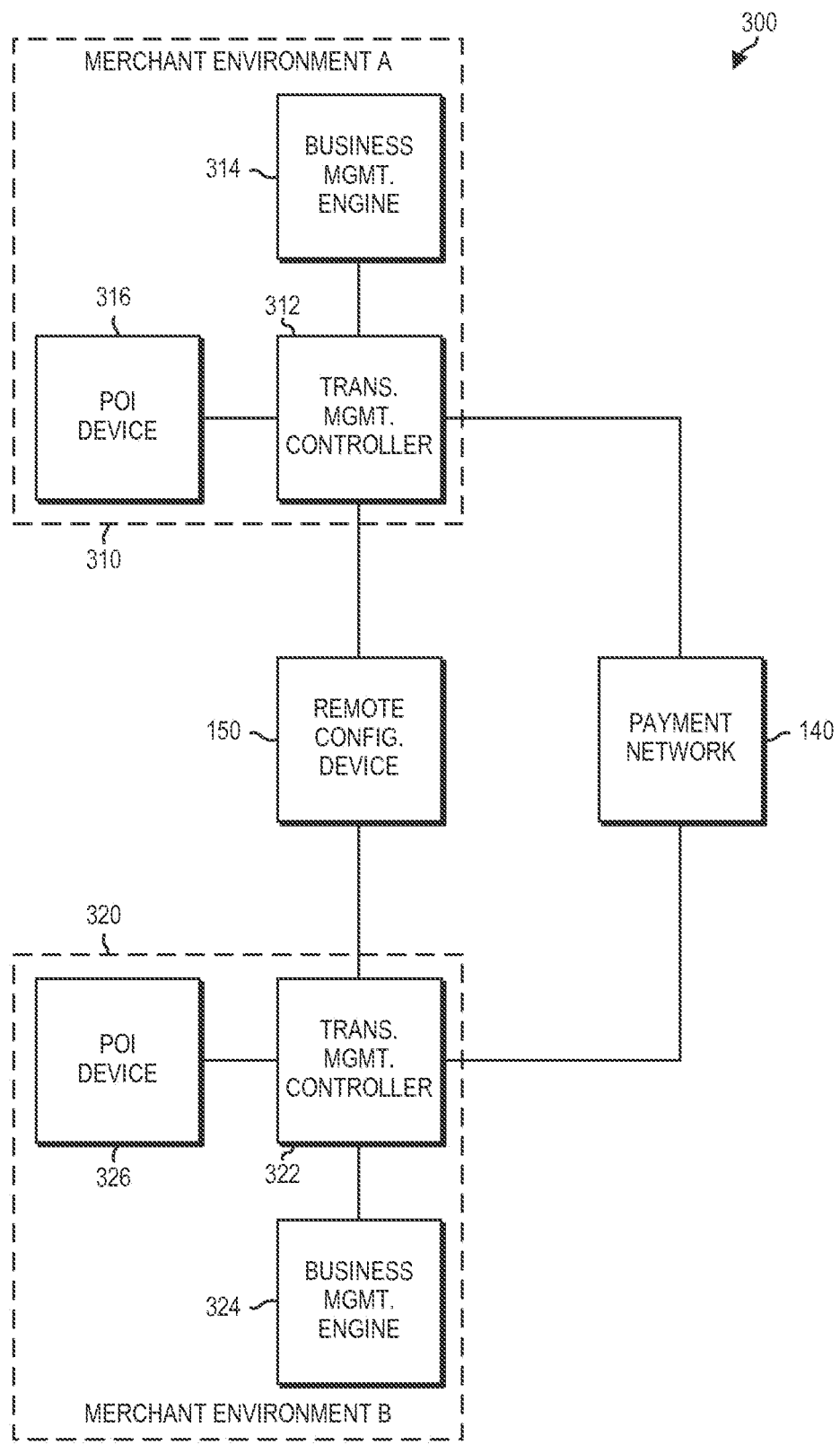
FIG. 3 is a simplified block diagram of at least one embodiment of a system for remotely configuring transaction management controllers.

Referring now to FIG. 3, in an embodiment, a system 300 for configuring multiple transaction management controllers includes the remote configuration device 150 and the payment network 140. The system 300 also includes a transaction management controller 312, a business management engine 314, and a POI device 316 of one merchant environment (e.g., the merchant environment A 310) and a transaction management controller 322, a business management engine 324, and a POI device 326 of another merchant environment (e.g., the merchant environment B 320). It should be appreciated that the transaction management controllers 312, 322, business management engines 314, 324, POI devices 316, 326, payment network 140, and remote configuration device 150 of the system 300 can be substantially similar to the transaction management controller 102, business management engine 120, POI device 130, payment network 140, and remote configuration device 150 of the system 100 of FIG. 1. In the illustrative embodiment, however, the remote configuration device 150 is configured to selectively manage multiple transaction management controllers (e.g., the transaction management controllers 312, 322).

Figure 4:
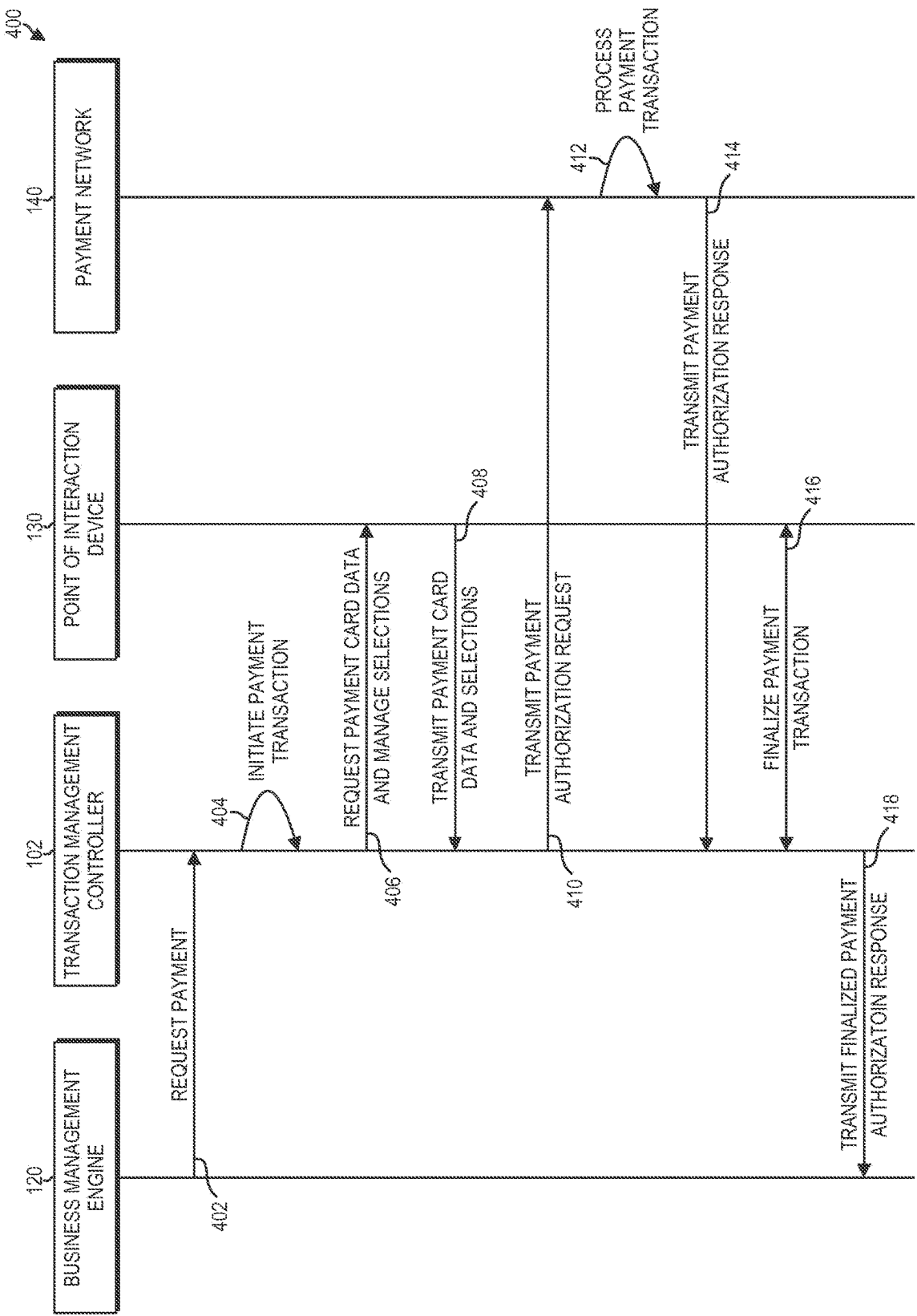
FIG. 4 is a simplified sequence flow diagram in accordance with at least one non-limiting embodiment.

Referring now to FIG. 4, a process 400 that may be executed by the devices of the system 100 begins with process flow 402. In process flow 402, the business management engine 120 transmits a payment request to the transaction management controller 102. The payment request includes a transaction amount and can be embodied as a Hypertext Transfer Protocol (HTTP) message. In embodiments in which the payment request is an HTTP message, the payment request can be embodied as an HTTP POST request or an HTTP PUT request. In such embodiments, one or more payment request parameters (e.g., transaction amount, payment type, etc.) can be sent to the transaction management controller 102 within a uniform resource locator (URL) that corresponds to the transaction management controller 102. Additionally or alternatively, the payment request can be embodied as an HTTP GET request or an HTTP DELETE request. In such embodiments, one or more of the payment request parameters can be sent to the transaction management controller 102 within the body of the HTTP message sent to the transaction management controller 102. Next, in process flow 404, the transaction management controller 102 initiates a payment transaction based at least in part on, or otherwise as a function of, the received payment request.

Subsequently, in process flow 406, the transaction management controller 102 requests payment card data for the initiated payment transaction from the POI device 130. In some embodiments, in processes flow 406, the transaction management controller 102 additionally manages payment selection options provided to a consumer via the POI device 130. For example, the transaction management controller 102 can transmit one or more instructions to the POI device 130 that cause the POI device 130 to display one or more selectable options (e.g., payment card type selection options, cashback selection options, language selection options, etc.) to a consumer. Additionally, as discussed above, the transaction management controller 102 can control other features and/or functions of the POI device 130 corresponding to a payment transaction.

In process flow 408, the POI device 130 transmits the payment card data to the transaction management controller 102. The payment card data can be captured by the POI device 130 in response to receipt of the request from the transaction management controller 102. Additionally, in embodiments in which the transaction management controller 102 manages the payment selection options provided to the consumer during the payment transaction, the selected options can be transmitted by the POI 130 to the transaction management controller 102.

Subsequently, in process flow 410, the transaction management controller 102 transmits transaction data for the payment transaction to the payment network 140 for processing. To do so, the transaction management controller inserts or incorporates the transaction amount received from the business management engine 120 and the payment card data received from the POI device 130 into a payment authorization request message. In some embodiments, the payment authorization request message can be embodied as a HTTP message. Additionally, in some embodiments, the payment network 140 includes a payment gateway. In such embodiments, the payment gateway is configured to receive the payment authorization request message from the transaction management controller 102.

In process flow 412, the payment network 140 processes the payment transaction based on the payment authorization response message received from the transaction management controller 102. As discussed, the payment network 140 is configured to receive and forward the payment authorization request message to an issuer financial institution via an issuer processor. Thereafter, the issuer financial institution associates the received payment card number with an account held and/or maintained by the issuer financial institution. After associating the received payment card number with an account, the issuer financial institution generates a payment authorization response message. The payment authorization response message can then be transmitted to the payment network 140 via the issuer processor. Next, in process flow 414, the payment network 140 (or the payment gateway of the payment network 140) transmits the received payment authorization response message to the transaction management controller 102.

Subsequently, in process flow 416, the transaction management controller 102 and the POI device 130 finalize the payment transaction and, in some embodiments, the payment authorization response message. For example, in some embodiment, the transaction management controller 102 can instruct the POI device 130 to capture a signature for the payment transaction. Additionally or alternatively, in some embodiments, an integrated circuit payment card (e.g., an EMV card or other smartcard) can be inserted into the POI device 130, which can include corresponding integrated circuit hardware and functionality. In such embodiments, the transaction management controller 102 can instruct the POI device 130 to write payment transaction data or account data back to the integrated circuit payment card. It should be appreciated that the transaction management controller 102 and the POI device 130 can perform any other function to finalize the payment transaction.

In process flow 418, the transaction management controller 102 transmits the finalized payment authorization response message to the business management engine 120. In some embodiments, the business management engine 120 generates a receipt for the payment transaction based at least in part on, or otherwise as a function of, the finalized payment authorization response message received from the transaction management controller 102.

Figure 5:
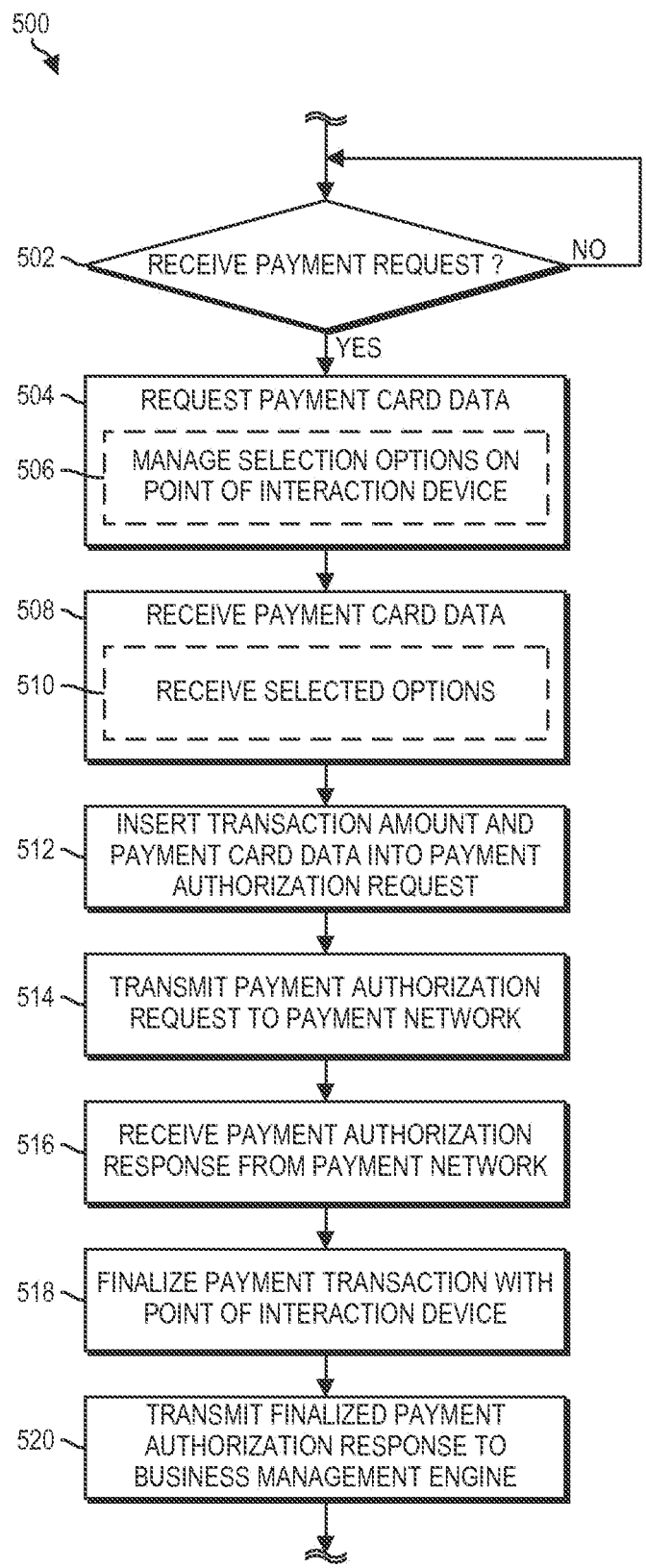
FIG. 5 is a simplified flow diagram of at least one embodiment of a method that may be executed by the transaction management controller of FIG. 1 for managing payment authorization request messaging for payment transactions.

Referring now to FIG. 5, a method 500 that may be executed by the transaction management controller 102 for managing payment authorization request messaging for payment transactions begins with decision block 502. In decision block 502, the transaction management controller 102 determines whether a payment request for a payment transaction is received from the business management engine 120. The payment request can include a transaction amount and can be embodied as a Hypertext Transfer Protocol (HTTP) message. If, in decision block 502, the transaction management controller 102 determines that a payment request is received, the method 500 advances to block 504. If, however, the transaction management controller 102 determines instead that a payment request is not received, the method 500 loops back to decision block 502 and the transaction management controller 102 continues monitoring for receipt of a payment request.

In block 504, the transaction management controller 102 requests payment card data for the payment transaction from the POI device 130. In some embodiments, in block 506, the transaction management controller manages selection options of the POI device 130 for the payment transaction. For example, the transaction management controller 102 can transmit one or more instructions to the POI device 130 that cause the POI device 130 to display payment card type selection options, cashback selection options, language selection options, or any other type of option selectable by a consumer during a payment transaction.

In block 508, the transaction management controller 102 receives the requested payment card data from the POI device 130. In some embodiments, the received payment card data includes a payment card number associated with a payment card used for the payment transaction. It should be appreciated, however, that the payment card data can include any other type of data associated with a payment transaction. In some embodiments, in block 510, the transaction management controller 102 receives any payment options selected by a consumer via the POI device 130.

In block 512, the transaction management controller 102 inserts or otherwise incorporates the transaction amount received from the business management engine 120 and the payment card data (e.g., the payment card number, etc.) received from the POI device 130 into a payment authorization request message. In some embodiments, the payment authorization request message can be embodied as a HTTP message. It should be appreciated, however, that the payment authorization request message can be embodied as any other type of message, in other embodiments.

In block 514, the transaction management controller 102 transmits the payment authorization request message to the payment network 140. As discussed, the payment network 140 can include a payment gateway communicatively coupled thereto configured to facilitate the transaction management controller 102 in processing payment transactions, in some embodiments. The payment network 140 can be configured to communicate with an issuer processor and/or and issuer financial institution and, based on the payment authorization request message, generate a payment authorization response message. In block 516, the transaction management controller 102 receives the payment authorization response message from the payment network 140 (or a payment gateway communicatively coupled thereto). In some embodiments, the payment authorization response message can be embodied as a HTTP message. It should be appreciated, however, that the payment authorization response message can be embodied as any other type of message, in other embodiments.

Subsequently, in block 518, the transaction management controller 102 finalizes the payment transaction and, in some embodiments, the payment authorization response message with the POI device 130. For example, in some embodiments, the transaction management controller 102 can instruct the POI device 130 to capture a signature for the payment transaction. In such embodiments, the transaction management controller 102 can receive captured signature data from the POI device 130. Additionally, in such embodiments, the payment authorization response message can be modified or augmented to include a byte array of the captured signature data. Additionally or alternatively, in some embodiments, the transaction management controller 102 can instruct the POI device 130 to write payment transaction data or account data back to an integrated circuit payment card used for a particular payment transaction.

In block 520, the transaction management controller 102 transmits the finalized payment authorization response message to the business management engine 120. In some embodiments, the business management engine 120 generates a receipt for the payment transaction based at least in part on, or otherwise as a function of, the finalized payment authorization response message received from the transaction management controller 102. In such embodiments, the business management engine 120 can be configured to print the generated receipt via a receipt printer communicatively coupled thereto.

Figure 6:
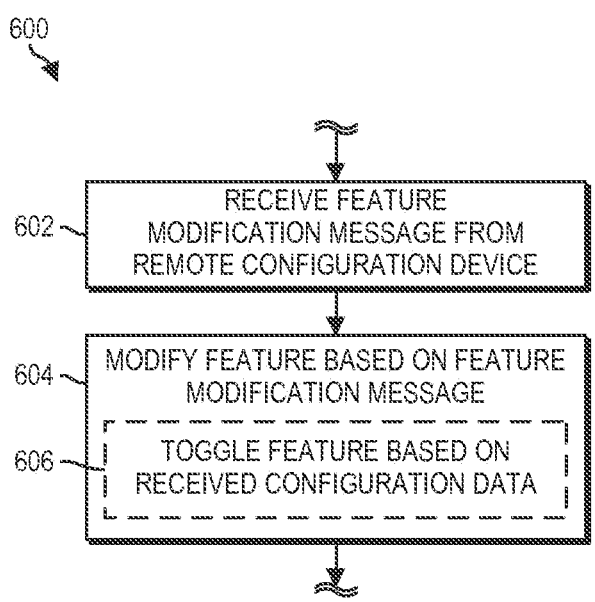
FIG. 6 is a simplified flow diagram of at least one embodiment of a method that may be executed by the transaction management controller of FIG. 1 for modifying payment processing features.

Referring now to FIG. 6, a method 600 that may be executed by the transaction management controller 102 for modifying payment processing features begins with block 602. In block 602, the transaction management controller 102 receives a feature modification message from the remote configuration device 150. The feature modification message includes configuration data or instructions to at least one of add or modify a local payment processing feature of the transaction management controller 102 and/or other devices of the system 100 (e.g., the POI device 130).

In block 604, the transaction management controller 102 modifies one or more local payment processing features based at least in part on, or otherwise as a function of, the received feature modification message. For example, in some embodiments, the transaction management controller 102 can, in block 606, toggle "on" or "off" (e.g., enable or disable) one or more local features based on the configuration data of the received feature modification message. In that way, the transaction management controller 102 (or other devices of the systems 100, 200, 300) can be remotely managed and configured.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A computer-implemented method for secure electronic transaction messaging, the method comprising:

receiving, by a transaction controller over one or more networks, an electronic transaction request from a management engine provided separately from the transaction controller, the electronic transaction request embodied as a first Hypertext Transfer Protocol (HTTP) message embodied as an HTTP POST request or an HTTP PUT request, and comprising at least one transaction parameter included in uniform resource locator (URL) that corresponds to the transaction controller, wherein the at least one transaction parameter includes a transaction amount;

transmitting, by the transaction controller over the one or more networks, an electronic payment data request to a point of interaction (POI) terminal provided separately from the transaction controller and the management engine, wherein the POI terminal and the management engine are communicatively isolated from each other via the transaction controller, the transaction controller situated in the one or more networks between the management engine and the POI terminal;

receiving, by the transaction controller over the one or more networks, electronic payment data from the POI terminal based on the electronic payment data request;

generating, by the transaction controller, an electronic transaction authorization request embodied as a second HTTP message different from the first HTTP message received from the management engine, and based at least in part on the at least one transaction parameter including the transaction amount from the management engine;

inserting into the electronic transaction authorization request at least a portion of the electronic payment data from the POI terminal; and transmitting, by the transaction controller over the one or more networks, the electronic transaction authorization request to a payment network.

2. The computer-implemented method of claim 1, further comprising:

receiving, by the transaction controller from a remote configuration device, a feature modification message comprising instructions to modify a feature of the transaction controller; and modifying, by the transaction controller, the feature of the transaction controller based on the instructions, wherein the modified feature of the transaction controller is associated with a payment processing feature.

3. The computer-implemented method of claim 1, further comprising:

receiving, by the transaction controller from a remote configuration device, a feature modification message comprising instructions to modify a feature of the POI terminal; and modifying, by the transaction controller, the feature of the POI terminal based on the instructions.

4. The computer-implemented method of claim 1, further comprising:

receiving, by the transaction controller, an electronic transaction authorization response from the payment network, wherein the electronic transaction authorization response corresponds to the electronic transaction authorization request; and transmitting, by the transaction controller, the electronic transaction authorization response to the management engine.

5. The computer-implemented method of claim 4, further comprising:

receiving, by the transaction controller, captured signature data from the POI terminal, wherein the electronic transaction authorization response transmitted to the management engine comprises a byte array including the captured signature data.

6. The computer-implemented method of claim 1, further comprising:

receiving, by the transaction controller from a remote configuration device, a feature modification message comprising instructions to modify a feature of the transaction controller; and modifying, by the transaction controller, the feature of the transaction controller based on the instructions, wherein the feature of the transaction controller comprises at least one of a device configuration feature, a transaction processing feature, and a multilane feature.

7. The computer-implemented method of claim 1, wherein transmitting the electronic transaction authorization request to a payment network comprises transmitting the electronic transaction authorization request to a gateway communicatively coupled to the payment network.

8. A system comprising:

one or more processors; and one or more computer readable media storing instructions which, when executed by the one or more processors, cause the one or more processors to perform operations for secure electronic transaction messaging, the operations comprising:

receiving, by a transaction controller over one or more networks, an electronic transaction request from a management engine provided separately from the transaction controller, the electronic transaction request embodied as a first Hypertext Transfer Protocol (HTTP) message embodied as an HTTP POST request or an HTTP PUT request, and comprising at least one transaction parameter included in uniform resource locator (URL) that corresponds to the transaction controller, wherein the at least one transaction parameter includes a transaction amount;

transmitting, by the transaction controller over the one or more networks, an electronic payment data request to a point of interaction (POI) terminal provided separately from the transaction controller and the management engine, wherein the POI terminal and the management engine are communicatively isolated from each other via the transaction controller, the transaction controller situated in the one or more networks between the management engine and the POI terminal;

receiving, by the transaction controller over the one or more networks, electronic payment data from the POI terminal based on the electronic payment data request;

generating, by the transaction controller, an electronic transaction authorization request embodied as a second HTTP message different from the first HTTP message received from the management engine, and based at least in part on the at least one transaction parameter including the transaction amount from the management engine;

inserting into the electronic transaction authorization request at least a portion of the electronic payment data from the POI terminal; and transmitting, by the transaction controller over the one or more networks, the electronic transaction authorization request to a payment network.

9. The system of claim 8, the operations further comprising:

receiving, by the transaction controller from a remote configuration device, a feature modification message comprising instructions to modify a feature of the transaction controller; and modifying, by the transaction controller, the feature of the transaction controller based on the instructions, wherein the modified feature of the transaction controller is associated with a payment processing feature.

10. The system of claim 8, the operations further comprising:

receiving, by the transaction controller from a remote configuration device, a feature modification message comprising instructions to modify a feature of the POI terminal; and modifying, by the transaction controller, the feature of the POI terminal based on the instructions.

11. The system of claim 8, the operations further comprising:

receiving, by the transaction controller, an electronic transaction authorization response from the payment network, wherein the electronic transaction authorization response corresponds to the electronic transaction authorization request; and transmitting, by the transaction controller, the electronic transaction authorization response to the management engine.

12. The system of claim 11, the operations further comprising:

receiving, by the transaction controller, captured signature data from the POI terminal, wherein the electronic transaction authorization response transmitted to the management engine comprises a byte array including the captured signature data.

13. The system of claim 8, the operations further comprising:

receiving, by the transaction controller from a remote configuration device, a feature modification message comprising instructions to modify a feature of the transaction controller; and modifying, by the transaction controller, the feature of the transaction controller based on the instructions, wherein the feature of the transaction controller comprises at least one of a device configuration feature, a transaction processing feature, and a multilane feature.

14. The system of claim 8, wherein transmitting the electronic transaction authorization request to a payment network comprises transmitting the electronic transaction authorization request to a gateway communicatively coupled to the payment network.

15. One or more non-transitory computer readable media storing instructions which, when executed by one or more processors, cause the one or more processors to perform operations for secure electronic transaction messaging, the operations comprising:

receiving, by a transaction controller over one or more networks, an electronic transaction request from a management engine provided separately from the transaction controller, the electronic transaction request embodied as a first Hypertext Transfer Protocol (HTTP) message embodied as an HTTP POST request or an HTTP PUT request, and comprising at least one transaction parameter included in uniform resource locator (URL) that corresponds to the transaction controller, wherein the at least one transaction parameter includes a transaction amount;

transmitting, by the transaction controller over the one or more networks, an electronic payment data request to a point of interaction (POI) terminal provided separately from the transaction controller and the management engine, wherein the POI terminal and the management engine are communicatively isolated from each other via the transaction controller, the transaction controller situated in the one or more networks between the management engine and the POI terminal;

receiving, by the transaction controller over the one or more networks, electronic payment data from the POI terminal based on the electronic payment data request;

generating, by the transaction controller, an electronic transaction authorization request embodied as a second HTTP message different from the first HTTP message received from the management engine, and based at least in part on the at least one transaction parameter including the transaction amount from the management engine;

inserting into the electronic transaction authorization request at least a portion of the electronic payment data from the POI terminal; and transmitting, by the transaction controller over the one or more networks, the electronic transaction authorization request to a payment network.

16. The one or more non-transitory computer readable media of claim 15, the operations further comprising:

receiving, by the transaction controller from a remote configuration device, a feature modification message comprising instructions to modify a feature of the transaction controller; and modifying, by the transaction controller, the feature of the transaction controller based on the instructions, wherein the modified feature of the transaction controller is associated with a payment processing feature.

17. The one or more non-transitory computer readable media of claim 15, the operations further comprising:

receiving, by the transaction controller from a remote configuration device, a feature modification message comprising instructions to modify a feature of the POI terminal; and modifying, by the transaction controller, the feature of the POI terminal based on the instructions.

18. The one or more non-transitory computer readable media of claim 15, the operations further comprising:

receiving, by the transaction controller, an electronic transaction authorization response from the payment network, wherein the electronic transaction authorization response corresponds to the electronic transaction authorization request; and transmitting, by the transaction controller, the electronic transaction authorization response to the management engine.

19. The one or more non-transitory computer readable media of claim 18, the operations further comprising:

receiving, by the transaction controller, captured signature data from the POI terminal, wherein the electronic transaction authorization response transmitted to the management engine comprises a byte array including the captured signature data.

20. The one or more non-transitory computer readable media of claim 15, the operations further comprising:

receiving, by the transaction controller from a remote configuration device, a feature modification message comprising instructions to modify a feature of the transaction controller; and modifying, by the transaction controller, the feature of the transaction controller based on the instructions, wherein the feature of the transaction controller comprises at least one of a device configuration feature, a transaction processing feature, and a multilane feature.

\* \* \* \* \*

UNITED STATES PATENT AND TRADEMARK OFFICE
CERTIFICATE OF CORRECTION

PATENT NO. : 11,301,854 B2
APPLICATION NO. : 16/844244
DATED : April 12, 2022
INVENTOR(S) : Francois B. Bergeon, Scot A. Bryant and Coy A. Christensen It is certified that error appears in the above-identified patent and that said Letters Patent is hereby corrected as shown below:

In the Claims

Column 15, Line 27, in Claim 1, delete "uniform" and insert --a uniform--.

Column 16, Line 54, in Claim 8, delete "uniform" and insert --a uniform--.

Column 18, Line 16, in Claim 15, delete "uniform" and insert --a uniform--.

Signed and Sealed this
Sixth Day of September, 2022

Katherine Kelly Vidal
*Director of the United States Patent and Trademark Office*